United States Patent [19]
Weder

[11] Patent Number: 5,792,535
[45] Date of Patent: *Aug. 11, 1998

[54] PAD OF WRAPPING MATERIAL HAVING ALTERNATING SIZES OF SHEETS

[75] Inventor: Donald E. Weder. Highland, Ill.

[73] Assignee: Southpac Trust International, Inc.

[*] Notice: The term of this patent shall not extend beyond the expiration date of Pat. No. 5,465,551.

[21] Appl. No.: 461,805

[22] Filed: Jun. 5, 1995

Related U.S. Application Data

[63] Continuation-in-part of Ser. No. 58,591, May 7, 1993, Pat. No. 5,465,551, which is a continuation-in-part of Ser. No. 968,798, Oct. 30, 1992, Pat. No. 5,369,934, which is a continuation of Ser. No. 865,563, May 21, 1992, Pat. No. 5,245,814, which is a continuation of Ser. No. 649,379, Jan. 31, 1991, Pat. No. 5,111,638, which is a continuation of Ser. No. 249,761, Sep. 26, 1988, abandoned, said Ser. No. 461,805, Continuation-in-part of Ser. No. 322,973, Oct. 12, 1994, Pat. No. 5,456,056, which is a continuation-in-part of Ser. No. 965,585, Oct. 23, 1992, abandoned, which is a continuation of Ser. No. 893,586, Jun. 2, 1992, Pat. No. 5,181,364, which is a continuation of Ser. No. 707,417, May 28, 1991, abandoned, which is a continuation of Ser. No. 502,358, Mar. 29, 1990, abandoned.

[51] Int. Cl.⁶ ........................................ B32B 3/02
[52] U.S. Cl. .................... 428/40.1; 281/44; 283/36; 283/42; 462/62; 462/63; 462/72; 428/42.1; 428/42.2; 428/42.3; 428/192; 428/194
[58] Field of Search ..................... 428/40.1, 41.7, 428/41.8, 42.1, 42.2, 42.3, 192, 194, 354, 355; 281/44; 462/62, 63, 672, 58, 61; 283/36, 42; 211/50, 59.2

[56] References Cited

U.S. PATENT DOCUMENTS

| Re. 21,065 | 5/1939 | Copeman | 93/2 |
| 732,889 | 7/1903 | Paver | 229/92 |
| 1,444,563 | 2/1923 | Hughes | 47/72 |
| 1,525,015 | 2/1925 | Weeks | 53/449 |
| 1,863,216 | 6/1932 | Wordingham | 206/284 |

(List continued on next page.)

FOREIGN PATENT DOCUMENTS

| 2610604 | 8/1988 | France . |
| 2651663 | 3/1991 | France . |
| 345464 | 2/1917 | Germany . |
| 658769 | 4/1938 | Germany | 462/63 |

OTHER PUBLICATIONS

Post It Note Pad® Manufactured by 3M Commercial Office Supply Division. St. Paul, MN. 55144–1000.
"The Simple Solution For Those Peak Volume Periods", Speed Cover Brochure, Highland Supply Corporation, 1989.
Speed Sheets and Speed Rolls Brochure, Highland Supply Corporation, 1990. 2 pages. Applicant admits that the product described in this brochure has been on sale over one year prior to the filing date of this application.

*Primary Examiner*—Nasser Ahmad
*Attorney, Agent, or Firm*—Dunlap & Codding, P.C.

[57] ABSTRACT

A pad of wrapping material made up of a plurality of sheets, wherein each alternating sheet is staggered in relation to an adjacent sheet for improving the ease with which the sheet is removed from the pad.

26 Claims, 6 Drawing Sheets

U.S. PATENT DOCUMENTS

| | | | |
|---|---|---|---|
| 1,978,631 | 10/1934 | Herrlinger | 91/68 |
| 2,048,123 | 7/1936 | Howard | 229/87 |
| 2,170,147 | 8/1939 | Lane | 206/56 |
| 2,247,191 | 6/1941 | Endres | 229/87 |
| 2,278,673 | 4/1942 | Savada et al. | 154/43 |
| 2,302,259 | 11/1942 | Rothfuss | 41/10 |
| 2,371,985 | 3/1945 | Freiberg | 206/46 |
| 2,411,328 | 11/1946 | MacNab | 32/12 |
| 2,510,120 | 6/1950 | Leander | 117/122 |
| 2,529,060 | 11/1950 | Trillich | 117/68.5 |
| 2,530,634 | 11/1950 | Schuessler | 462/63 |
| 2,621,142 | 12/1952 | Wetherell | 154/117 |
| 2,628,110 | 2/1953 | Hauer | 462/63 |
| 2,822,287 | 2/1958 | Avery | 117/14 |
| 2,846,060 | 8/1958 | Yount | 206/58 |
| 2,850,842 | 9/1958 | Eubank, Jr. | 47/58 |
| 2,883,262 | 4/1959 | Borin | 21/56 |
| 3,022,605 | 2/1962 | Reynolds | 47/58 |
| 3,121,647 | 2/1964 | Harris et al. | 118/202 |
| 3,130,113 | 4/1964 | Silman | 161/97 |
| 3,134,679 | 5/1964 | Dreyfus | 99/171 |
| 3,271,922 | 9/1966 | Wallerstein et al. | 53/3 |
| 3,376,666 | 4/1968 | Leonard | 47/41 |
| 3,508,372 | 4/1970 | Wallerstein et al. | 53/3 |
| 3,556,389 | 1/1971 | Gregoire | 229/53 |
| 3,620,366 | 11/1971 | Parkinson | 206/59 |
| 3,681,105 | 8/1972 | Milutin et al. | 117/15 |
| 3,793,799 | 2/1974 | Howe et al. | 53/32 |
| 4,006,561 | 2/1977 | Thoma et al. | 47/58 |
| 4,054,697 | 10/1977 | Reed et al. | 428/40 |
| 4,091,925 | 5/1978 | Griffo et al. | 206/423 |
| 4,118,890 | 10/1978 | Shore | 47/28 |
| 4,189,868 | 2/1980 | Tymchuck et al. | 47/84 |
| 4,216,620 | 8/1980 | Weder et al. | 47/72 |
| 4,280,314 | 7/1981 | Stuck | 53/241 |
| 4,297,811 | 11/1981 | Weder | 47/72 |
| 4,300,312 | 11/1981 | Weder | 47/72 |
| 4,333,267 | 6/1982 | Witte | 47/84 |
| 4,380,564 | 4/1983 | Cancio et al. | 428/167 |
| 4,413,725 | 11/1983 | Bruno et al. | 206/45.33 |
| 4,546,875 | 10/1985 | Zweber | 206/0.82 |
| 4,640,079 | 2/1987 | Stuck | 53/390 |
| 4,765,464 | 8/1988 | Ristvedt | 206/0.82 |
| 4,773,182 | 9/1988 | Weder et al. | 47/72 |
| 4,996,822 | 3/1991 | Truppe | 53/216 X |
| 5,100,178 | 3/1992 | MacKelvie | 281/44 |
| 5,181,364 | 1/1993 | Weder | 53/397 |
| 5,228,234 | 7/1993 | de Klerk et al. | 47/41.01 |
| 5,235,782 | 8/1993 | Landau | 47/72 |

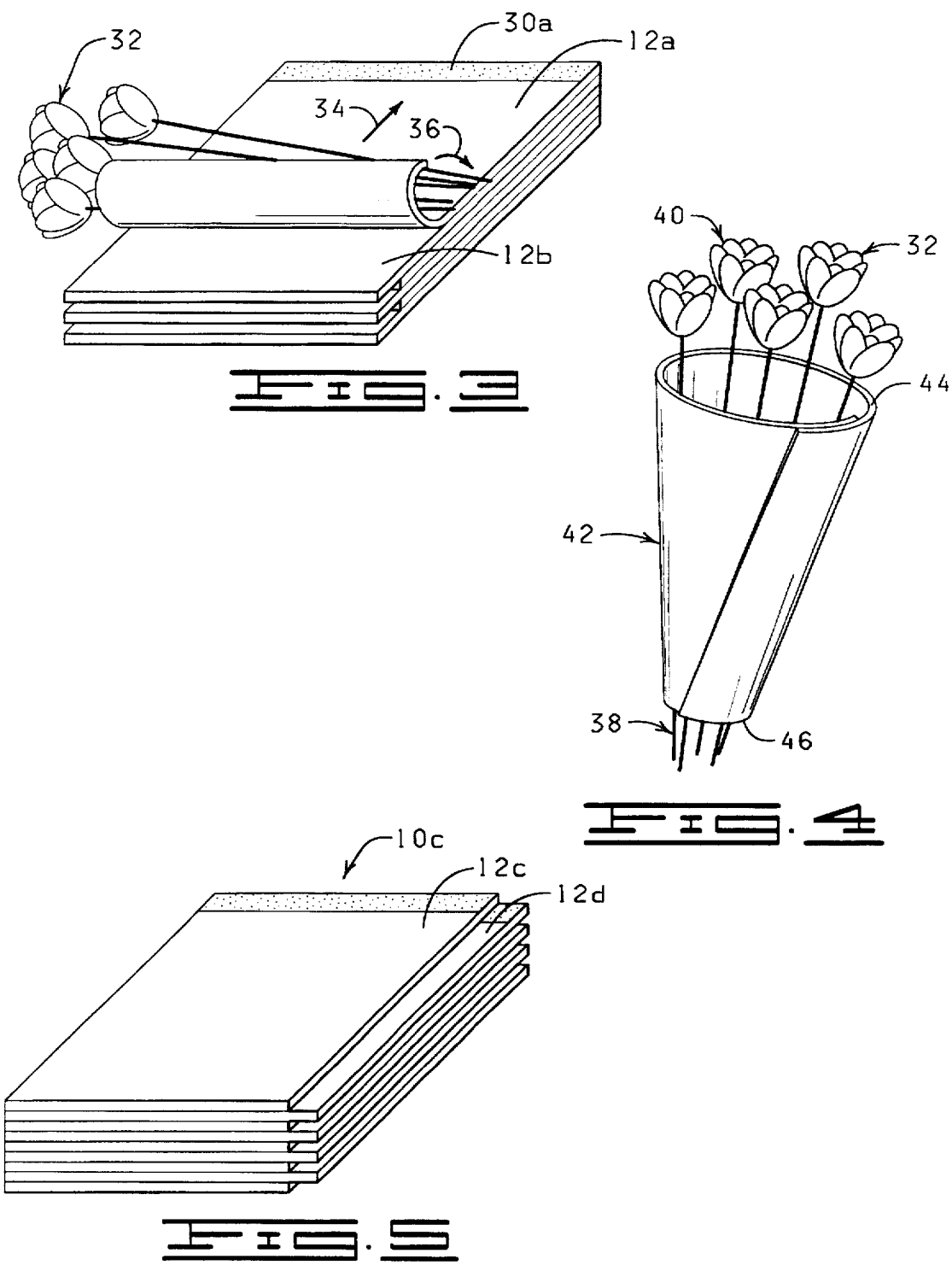

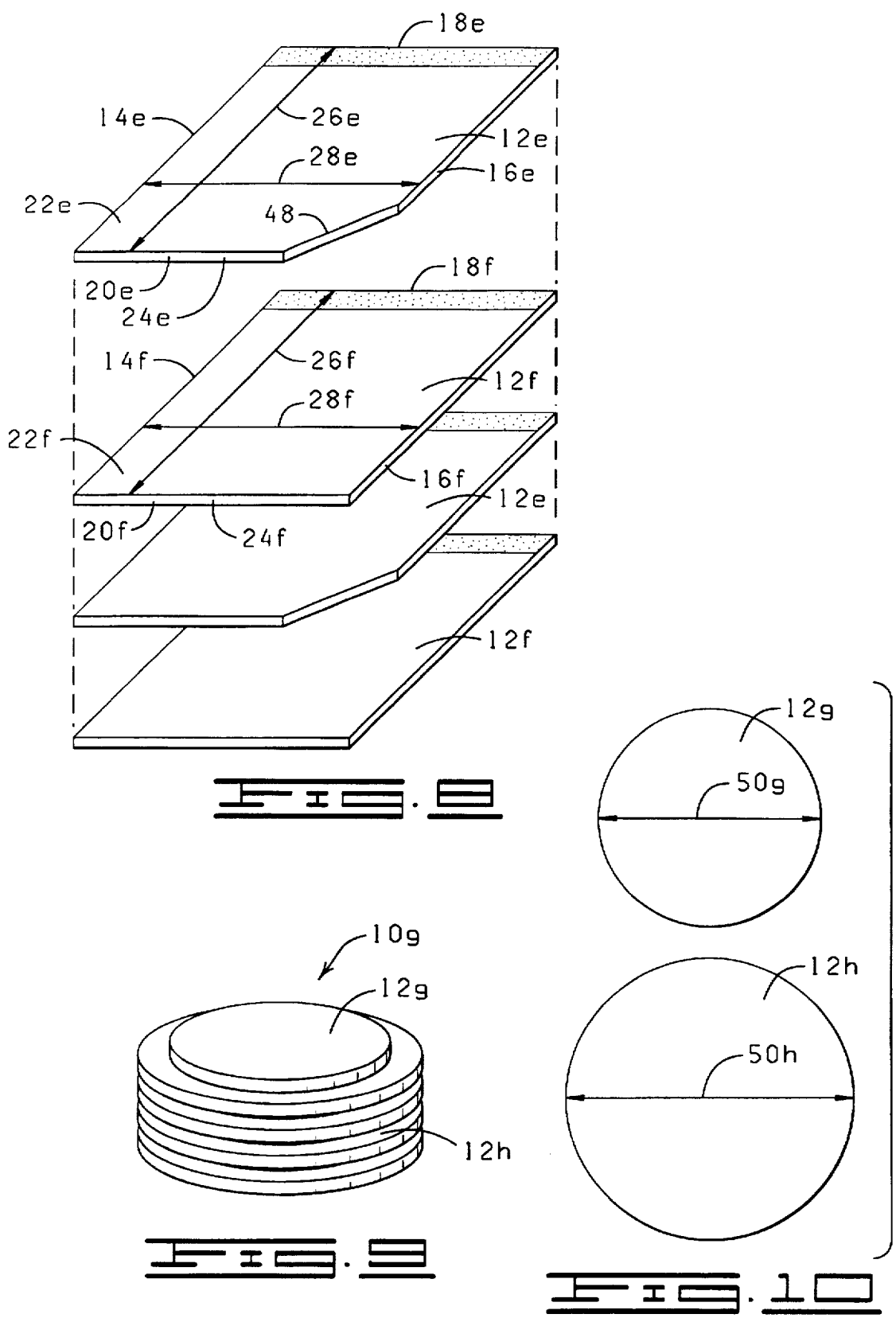

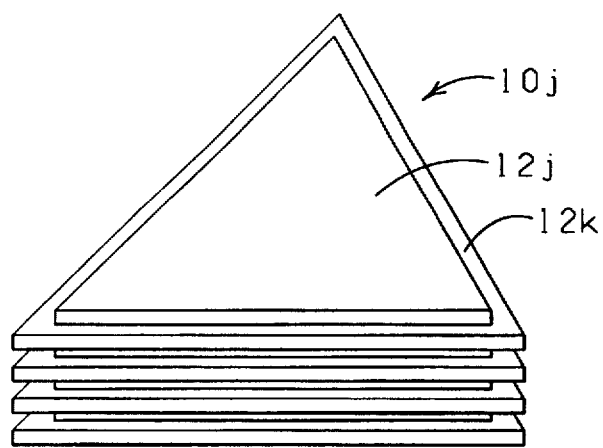
Fig. 11
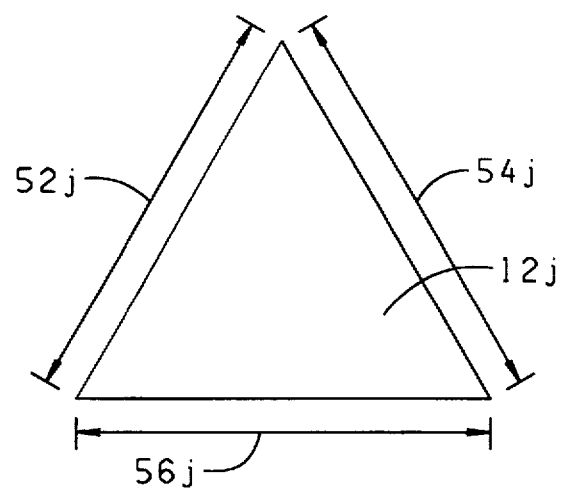
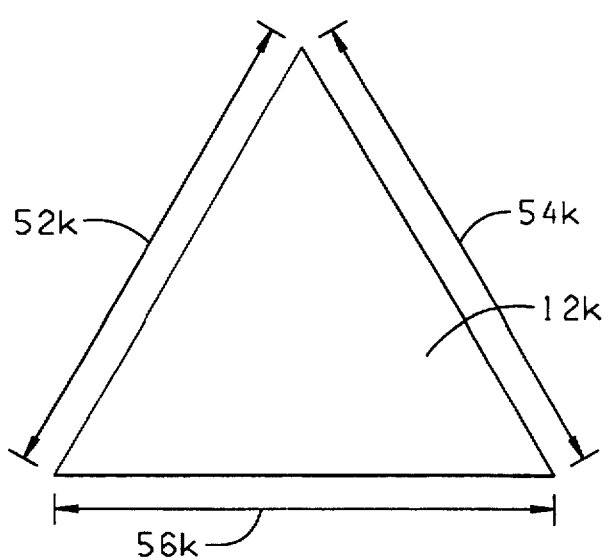
Fig. 12

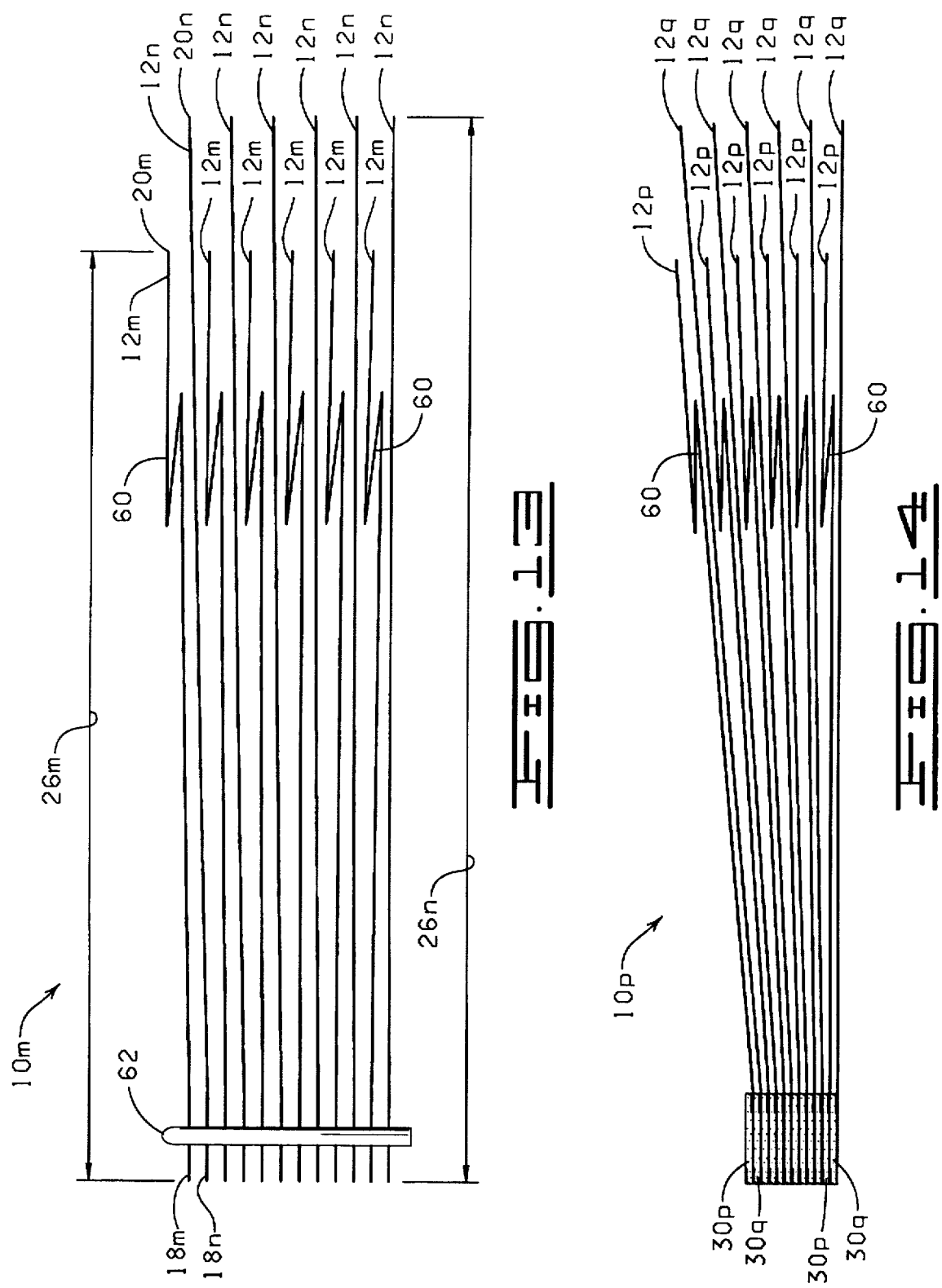

ns
5,792,535

1

PAD OF WRAPPING MATERIAL HAVING ALTERNATING SIZES OF SHEETS

RELATED REFERENCES

This application is a continuation-in-part of U.S. Ser. No. 08/058,591, filed May 7, 1993, entitled A Method For Wrapping An Item With A Sheet Of Material From A Pad Of Sheets Of Material, now U.S. Pat. No. 5,465,551 issued Nov. 14, 1995; which is a continuation-in-part of U.S. Ser. No. 07/968,798, filed Oct. 30, 1992, entitled Method And Apparatus For Covering Portions Of An Object With A Sheet Of Material Having Pressure Sensitive Adhesive Coating Applied To At Least A Portion Of At Least One Surface Of The Sheet Of Material, now U.S. Pat. No. 5,369,934, issued Dec. 6, 1994; which is a continuation of U.S. Ser. No. 07/865,563, filed May 21, 1992, entitled Methods For Wrapping A Floral Grouping, now U.S. Pat. No. 5,245,814, issued Sep. 21, 1993; which is a continuation of U.S. Ser. No. 07/649,379, filed Jan. 31, 1991, entitled Method For Wrapping An Object With A Material Having Pressure Sensitive Adhesive Thereon, now U.S. Pat. No. 5,111,638, issued May 12, 1992; which is a continuation of U.S. Ser. No. 07/249,761, filed Sep. 26, 1988, entitled Method For Wrapping An Object With A Material Having Pressure Sensitive Adhesive Thereon, now abandoned.

This application is also a continuation-in-part of U.S. Ser. No. 08/322,973, filed Oct. 12, 1994, entitled Wrapping A Floral Grouping With Sheets Having Adhesive Or Cohesive Material Applied Thereto, now U.S. Pat. No. 5,456,056, issued Oct. 10, 1995; which is a continuation-in-part of U.S. Ser. No. 07/965,585, filed Oct. 23, 1992, entitled Wrapping A Floral Grouping With Sheets Having Adhesive Or Cohesive Material Applied Thereto, now abandoned; which is a continuation of U.S. Ser. No. 07/893,586, filed Jun. 2, 1992, entitled Wrapping A Floral Grouping With Sheets Having Adhesive Or Cohesive Material Applied Thereto, now U.S. Pat. No. 5,181,364, issued Jan. 26, 1993; which is a continuation of U.S. Ser. No. 07/707,417, filed May 28, 1991, entitled Wrapping A Floral Grouping With Sheets Having Adhesive Or Cohesive Material Applied Thereto, now abandoned; which is a continuation of U.S. Ser. No. 07/502,358, filed Mar. 29, 1990, entitled Wrapping A Floral Grouping With Sheets Having Adhesive Or Cohesive Material Applied Thereto, now abandoned.

FIELD OF THE INVENTION

The present invention relates generally to wrapping an item such as a floral grouping with a sheet of material wherein sheets of material in the form a pad are organized so that some of the sheets of material have a predetermined shape which is different than the shape of the other sheets of material to facilitate the removal of the top sheet of material from the pad.

BRIEF DESCRIPTION OF THE DRAWINGS

FIG. 3 is a perspective view of the pad of FIG. 1 showing the top sheet of material of the pad being wrapped about a floral grouping.

FIG. 4 is a perspective view of the sheet of material removed from the pad and wrapped about the floral grouping.

FIG. 5 is a perspective view of a modified pad of sheets of material constructed in accordance with the present invention.

FIG. 8 is an exploded view of four sheets of material from the pad shown in FIG. 7 prior to the sheets of material being connected in the form of the pad.

FIG. 9 is a perspective view of another modified pad.

FIG. 10 is an exploded view of two of the sheets of material from the pad shown in FIG. 9 prior to connecting the sheets of material in the form of the pad.

FIG. 11 is another modified pad constructed in accordance with the present invention.

FIG. 12 is an exploded view of two of the sheets of material from the pad shown in FIG. 11 prior to the sheets of material being connected in the form of the pad.

FIG. 13 is a side view of a pad of sheets of material wherein each alternating sheet has a fold for shortening the sheet.

FIG. 14 is a side view of a pad like the pad of FIG. 13, but wherein the sheets are connected together via a bonding material.

DESCRIPTION OF THE PREFERRED EMBODIMENTS

Figure 1:
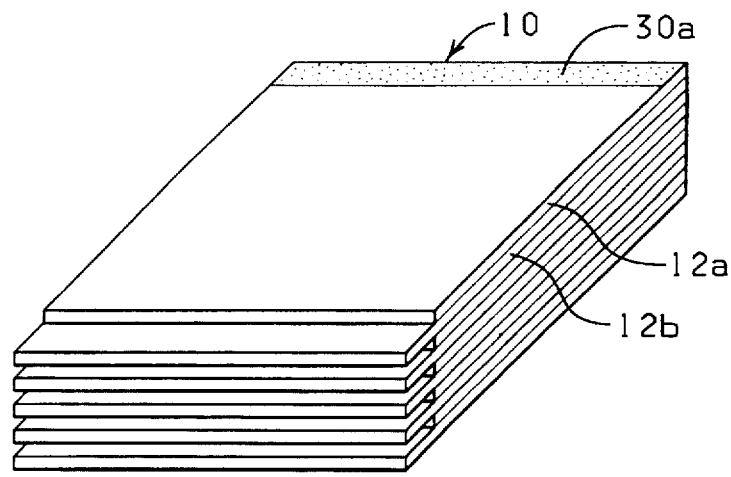
FIG. 1 is a perspective view of a pad of sheets of material constructed in accordance with the present invention.

Shown in FIG. 1 is a pad 10 constructed in accordance with the present invention. The pad 10 comprises a plurality of sheets of material 12 stacked one on top of the other to form the pad 10. The sheets of material 12 in the pad 10 form a top sheet of material 12 with the remaining sheets of material 12 being disposed under the top sheet of material 12.

The sheets of material 12 are stacked one on top of the other to form the pad 10 whereby some of the sheets of material (designated 12a in FIGS. 1 and 2) comprise even numbered sheets of material 12a and the remaining sheets of material (designated 12b in FIGS. 1 and 2) comprise odd numbered sheets of material 12b. Each of the odd numbered sheets of material 12b is disposed between a pair of even numbered sheets of material 12a when the sheets of material 12 are stacked to form the pad 10. The even numbered sheets of material 12a have a predetermined shape which is different than the predetermined shape of the odd numbered sheets of material 12b so that a portion of each odd numbered sheet of material 12b extends beyond the even numbered sheet of material 12a disposed thereon when the sheets of material are stacked in the form of the pad 10 to facilitate the removal of the top sheet of material 12a or 12b from the pad 10.

Each of the sheets of material 12 has a first side 14, a second side 16, a first end 18, a second end 20, an upper surface 22 and a lower surface 24. The sides, ends and surfaces of the even numbered sheets of material 12a are designated in FIG. 2 by the respective reference numerals 14a, 16a, 18a, 20a, 22a and 24a. The respective sides, ends and surfaces of the odd numbered sheets of material 12b are designated in FIG. 2 by the respective numerals 14b, 16b, 18b, 20b, 22b and 24b.

Each even numbered sheet of material 12a has a length 26a extending between the first end 18a and the second end 20a thereof. Each even numbered sheet 12a has a width 28a extending between the first side 14a and the second side 16a thereof.

Each odd numbered sheet of material 12b has a length 26b extending between the first end 18b and the second end 20b thereof. Each odd numbered sheet of material has a width 28b extending between the first side 14b and the second side 16b thereof.

Figure 2:
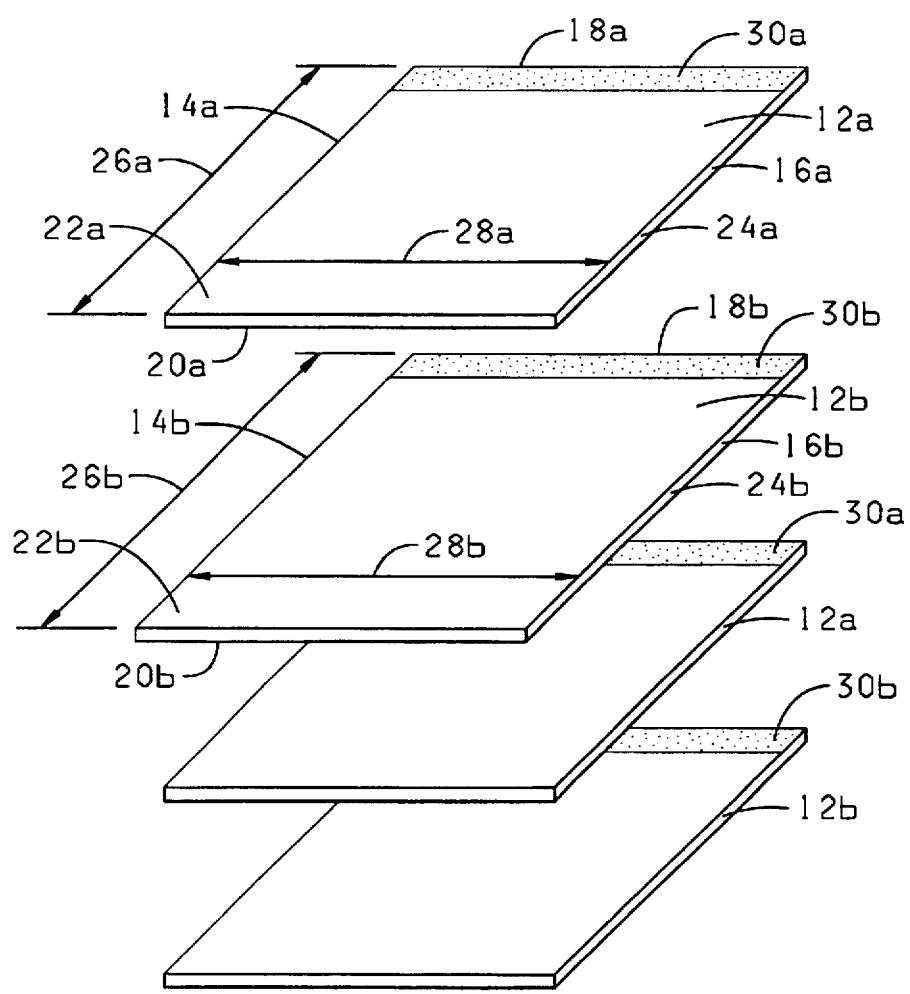
FIG. 2 is an exploded view showing four sheets of material prior to the sheets of material being connected into the pad shown in FIG. 1.

The lengths 26 and the widths 28 are shown in FIG. 2 only with respect to one of the even numbered sheets of material 12a and only with respect to the one of the odd numbered sheets of material 12b. The length 26a of each even number sheet of material 12a is less than the length 26b of each of the odd numbered sheets of material 12b. Thus, when the sheets of material 12a and 12b are stacked one on top of the other to form the pad 10 with one of the sheets of material 12a forming the top sheet of material, a portion of the odd numbered sheet of material 12b disposed directly under the top sheet of material 12a extends a distance beyond the second end 20a of the top sheet of material 12a and extends a distance beyond the second end 20b of the even numbered sheet of material 12a disposed thereunder forming what maybe referred to as an interface between the sheets of material 12a and the sheets of material 12b.

When the even numbered sheets of material 12a and the odd numbered sheets of material 12b are stacked in the form of the pad 10, the first sides 14a and 14b are aligned, the second sides 16a and 16b are aligned and the first ends 18a and 18b are aligned. A portion of each odd numbered sheet of material 12b extends a distance outwardly from the even numbered sheet of material 12a disposed on top thereof to provide the interface just described. In the case of the pad 10, a portion of each odd numbered sheet of material 12b near the second end 20b thereof extends a distance beyond the second end 20a of the even numbered sheet of material 12a disposed thereon to form the interface just described.

Each of the sheets of material 12 has a bonding material 30 disposed on a portion of the upper surface 22 thereof. The bonding material 30 is disposed near the first end 18 and extends generally between the first and the second sides 14 and 16 thereof. The bonding material is shown in FIGS. 1 and 2 and designated by the reference numerals 30a and 30b for the respective sheets of material 12a and 12b.

The upper surface 22 of each of the sheets of material 12 is disposed generally adjacent the lower surface 22 of an adjacent sheet of material 12 in the pad 10. The bonding material 30 on the upper surface 22 of each of the sheets of material 12 bondingly connects each of the sheets of material 12 with the sheet of material 12 disposed thereon for connecting the sheets of material 12 and maintaining the sheets of material 12 in the form of the pad 10.

The bonding material 30 is constructed so that each of the sheets of material 12 in the pad 10 is releasably connected to at least one other sheet of material 12 via the bonding material 30 so that a sheet of material 12 can be removed from the pad 10 by lifting the sheet of material 12 from the pad 10 and disconnecting the bond formed by the bonding material 30.

The sheets of material are stacked in the form of the pad 10 thereby providing the top sheet of material which is disposed generally on top of the pad 10 with the other sheets of material 12 being disposed generally under the top sheet of material 12. As shown in FIG. 1, the top sheet of material is an even numbered sheet of material 12a, although the top sheet of material could be an odd numbered sheet of material 12b. In fact, when the even numbered sheet of material 12a is removed from the pad 10 shown in FIG. 1, the odd numbered sheet of material 12b thereunder becomes the top sheet of material 12.

In operation, the item to be wrapped or, more particularly, a floral grouping 32 is placed on a portion of the top sheet of material 12, as shown in FIG. 3, generally near the second end 20 of the top sheet of material 12. An operator then lifts a portion of the top sheet of material 12 generally near the second end 20 thereof and places the lifted portion of the top sheet of material 12 generally about a portion of the floral grouping 32, as shown in FIG. 3. In this position, the top sheet of material 12 and the floral grouping are rolled in a general direction 34 (FIG. 3) thereby rolling the top sheet of material 12 generally about the floral grouping 32. The top sheet of material 12 and the floral grouping 32 are continued to be rolled in a rolling direction 36 (FIG. 3) and in the direction 34 until the floral grouping 32 is disposed generally adjacent the first end 18 of the top sheet of material 12. In this position, the operator continues to roll the top sheet of material 12 and the floral grouping 32 disposed therein in the rolling direction 36 and in the direction 34 thereby lifting the top sheet of material 12 from the bonding material 30 on the upper surface 22 of the top sheet of material 12 and simultaneously disconnecting the top sheet of material 12 from the bonding connection between the top sheet of material 12 and the sheet of material 12 disposed under the top sheet of material 12.

As the floral grouping 32 and the top sheet of material 12 are rolled over the bonding material 30 on the upper surface 22 of the top sheet of material 12, the bonding material 30 bondingly connects to an adjacent portion of the top sheet of material 12 thereby securing a top sheet of material 12 securely wrapped about the floral grouping 32, as shown in FIG. 4.

When the top sheet of material 12 has been secured about the floral grouping 32 in the manner just described, the sheet of material 12 generally under the top sheet of material 12 then provides a new top sheet of material and the process can be repeated for wrapping additional or other floral groupings 32.

Each of the sheets of material 12 has the length 26 and the width 28 sized so that the sheet of material 12 is sized to be wrapped about and encompass a substantial portion of the floral grouping 32. The sheet of material 12 is sized to be sufficient so that each of the sheets of material 12 extends over a substantial portion of the floral grouping 32 when the sheet of material 12 has been wrapped about the floral grouping 32 in accordance with the present invention.

The floral grouping 32 has a stem end 38 and a bloom end 40. In one embodiment, the sheets of material 12 are sized to encompass a substantial portion of the stem end 38 of the floral grouping 32. The bonding material 30 is positioned on the sheet of material so that the bonding material 30 cooperates to tightly wrap the sheet of material 12 about the stem end of the floral grouping and provide a wrapper 42 which substantially encompasses the floral grouping 32. The wrapper 42 is substantially conically shaped, although it could be other shapes including cylindrical, with an open upper end 44 and an open lower end 46. A portion of the stem end 38 of the floral grouping extends through the open lower end 46 of the wrapper 42 and the open upper end 44 of the wrapper 42 substantially encompasses and is loosely wrapped about the bloom end 40 of the floral grouping 32. In some embodiments, the stem end 38 of the floral grouping 32 may not extend through the lower end 46 of the wrapper 42 and the lower end 46 may be bondingly closed via the bonding material 30.

It should be noted that, although the sheets of material 12 have been described herein as being wrapped about a floral grouping 32, the sheets of material 12 may be wrapped about any item and the floral grouping 32 has been shown and described herein for illustration purposes only.

The term "bonding material" as used herein means an adhesive, preferably a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" as used herein also means a heat sealing lacquer which may be applied to the sheet of material and, in this instance, heat also must be applied to effect the sealing. The term "bonding material" as used herein means any type of material or thing which can be used to effect the bonding or connecting of the two adjacent portions of the material or sheet of material to effect the connection or bonding described herein. The term "bonding material" also includes labels, bands, ribbons, strings, tape, staples or combinations thereof. Some of the bonding materials would secure the ends of the material while other bonding material may bind the circumference of the wrapper 42. In some embodiments, holes may be placed through the sheets of material 12 near the first ends 18 and the sheets may then be disposed on a wicket, the sheets being dispensed from that wicket. In this last mentioned case, the sheets of material 12 may or may not be bondingly connected by way of a bonding material. The wicket in essence connects the sheets of material 12 in the form of the pad 10. The sheets of material 12 also simply could be placed in a box and dispensed from the box without the sheets of material 12 being physically connected.

"Floral grouping" as used herein means cut fresh flowers, artificial flowers, a single flower, other fresh and/or artificial plants or other floral materials and may include other secondary plants and/or ornamentation which add to the aesthetics of the overall floral grouping.

The sheet of material 12 is constructed from any suitable flexible material that is capable of being wrapped about the floral grouping 12, as described herein. Preferably, the sheet of material 12 is constructed of a material selected from a group of materials consisting of paper, metal foil, cloth (natural or synthetic), denim, burlap or polymer film or combinations thereof.

It should be noted that, although each of the sheets of material 12 have been described herein as being identical in shape and each of the sheets of material 12b have been described herein as being identical in shape, the sheets of material 12a may have different shapes and the sheets of material 12b may have different shapes so long as the predetermined shape of the even numbered sheets of material 12a are different than the predetermined shapes of the odd numbered sheets of material 12b to provide the interface between the sheets of material 12a and 12b to facilitate the removal of the top sheet of material 12 from the pad 10. It also should be noted that, although the sheets of material 12a and 12b have been shown in FIGS. 1, 2 and 3 as being square or rectangularly shaped, the sheets of material 12a and 12b could be any other geometric shape. For example, the sheets of material 12a might be rectangularly shaped and the sheets of material 12b might be circularly shaped to provide the required interfaces between the sheets of material 12a and 12b. After circularly or triangularly shaped. The foregoing comments, also relate to the modified embodiments to be described below.

Each of the sheets of material 12a and 12b also might be circularly shaped with the diameter of the sheets of material 12a being less than the diameter of the sheets of material 12b for example to provide the required interface (FIGS. 9 and 10). The sheets of material 12a and 12b also might be constructed in the form of triangles with the triangles being shaped so that the triangular shape of each sheet of material 12b is slightly larger than the triangular shape of each sheet 12a to provide the required overlap interface. (See FIGS. 11 and 12.)

It also should be noted that, in some embodiments, the top sheet of material 12 can be removed from the pad 10 and then wrapped about the floral grouping or item if desired in a particular application.

EMBODIMENT OF FIGS. 5 AND 6

Shown in FIG. 5 is a modified pad 10c comprising a plurality of even numbered sheets of material 12c and 12d. The pad 10c is constructed identical to the pad 10 shown in FIGS. 1 and 3 and described in detail before, except the pad 10c comprises the even numbered sheets of material 12c and the odd numbered sheets of material 12d.

The sheets of material 12c and 12d are constructed identical to the sheets of material 12a and 12b described before, except the lengths 26c and 26d are substantially equal and the widths 28c of the sheets of material 12c are less than the widths 28d of the sheets of material 12d to provide the overlap or interface between the sheets of material 12c and 12d to facilitate the removal of the sheets 12 from the pad 10c. A portion of each of the odd numbered sheets of material 12d near the second side 16d extends a distance beyond the second side 16c of the even numbered sheet of material 12c disposed thereon to provide the interface.

The sheets of material 12c and 12d are wrapped about the item or floral grouping in the manners like that described before in connection with FIGS. 1–4.

EMBODIMENT OF FIGS. 7 AND 8

Figure 7:
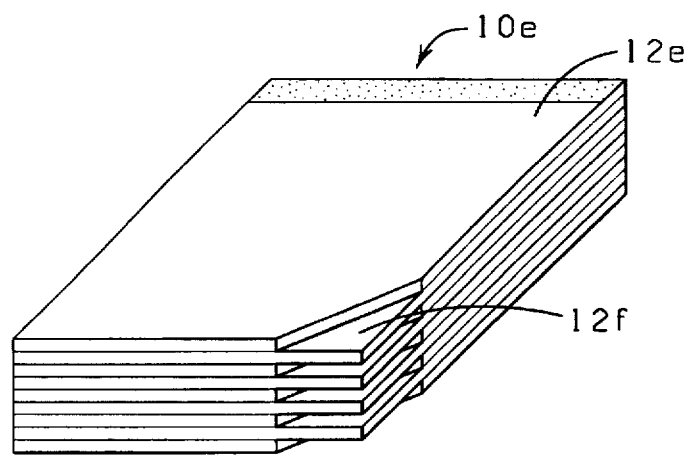
FIG. 7 is a perspective view of another modified pad constructed in accordance with the present invention.

Shown in FIG. 7 is another modified pad 10e which is constructed exactly like the pads 10 and 10c described in detail before, except the pad 10e is comprised of sheets of material 12e and 12f with the individual sheets 12e and 12f being shown in greater detail in FIG. 8. The sheets of material 12e and 12f are constructed exactly like the sheets of material 12a and 12b shown in FIG. 2 and described in detail before, except the lengths 26e of each of the even numbered sheets of material 12e are identical to the lengths 26f of each of the odd numbered sheets of material 12f and the widths 28e of each of the even numbered sheets of material 12e are identical to the widths 28f of each of the odd numbered sheets of material 12f.

Each of the even numbered sheets of material 12e includes a notch 48 which is formed by cutting one corner adjacent the intersection of the second side 16e and the second end 20e from the sheet of material 12e. The notched portion 48 thus permits the exposure of a portion of the sheet of material 12f disposed under the sheet of material 12e providing the interface to facilitate the removal of the even numbered sheets of material 12e and the odd numbered sheets of material 12f from the pad 10e. The even numbered sheets of material 12e and the odd numbered sheets of material 12f are wrapped about the item or floral grouping in the manners exactly like that described before.

EMBODIMENT OF FIGS. 9 AND 10

Shown in FIG. 9 is another modified pad log which is constructed exactly like the pads described before, except the pad log includes modified even numbered sheets of material 12g and modified odd numbered sheets of material 12h. The even numbered sheets of material 12g and the odd numbered sheets of material 12h are constructed exactly like the sheets of material 12 described in detail before, except the even numbered sheets of material 12g and the odd numbered sheets of material 12h each are circularly shaped having a diameter 50. The diameter of the even numbered sheets of material 12g being designated in FIG. 10 by the reference numeral 50g and the diameter of the odd numbered sheets of material 12h being designated in FIG. 10 by the reference numeral 50h. The diameter 50g of the even numbered sheets of material 12g is smaller than the diameter 50h of the odd numbered sheets of material 12h. Thus, when one of the even numbered sheets of material 12g is stacked on top of one of the odd numbered sheets of material 12h, a portion of the sheet of material 12h extends beyond the sheet of material 12g disposed on top thereof and is exposed to facilitate the removal of the sheets of material from the pad 10g in a manner exactly like that described.

The sheets of material 12g and 12h are wrapped about the floral grouping in manners exactly like that described before in connection with the other sheets of material.

EMBODIMENTS OF FIGS. 11 AND 12

Shown in FIG. 11 is another modified pad 10j which is constructed exactly like the pads described in detail before, except the pad 10j includes modified sheets 12j and 12k shown in regular detail in FIG. 12. The sheets of material 12 are triangularly shaped having side lengths 52 and 54 and a base length 56. The side lengths and the base length of the even numbered sheet of material 12j as shown in FIG. 12 and designated by the respective reference numerals 52j, 54j and 56j. The side lengths and the base length of the odd numbered sheet of material 12k shown in FIG. 12 and designated therein by the respective reference numeral 52k, 54k and 56k.

The side lengths 52j and 54j each are larger than the side lengths 52k and 54k of the odd numbered sheets of material 12k and the base length 56j is smaller than the side length 56k of the odd numbered sheets of material 12k. Thus, when one of the even numbered sheets of material 12j is disposed on top of one of the odd numbered sheets of material 12k, portions of the odd numbered sheet of material 12k is exposed or not covered by the even numbered sheet of material 12j disposed thereon for providing the interface to facilitate the removal of the sheets 12j and 12k from the pad 10j.

It should be noted that only the side length 52j may be smaller than the side length 52k or only the side length 54j may be smaller than the side length 54k or only the base length 56j may be smaller than the side length 56k to provide the required exposure to facilitate the removal of the sheets 12j and 12k from the pad 10j for the reasons described before.

Figure 6:
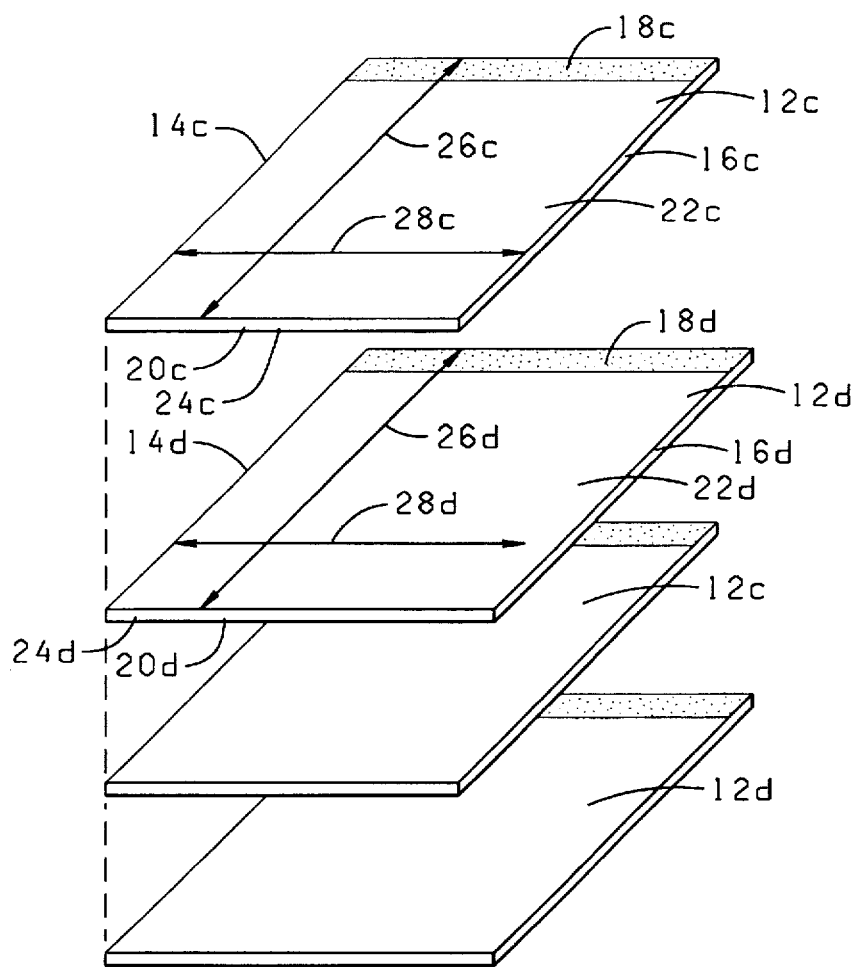
FIG. 6 is an exploded view of four sheets of material prior to the sheets of material being connected into the pad shown in FIG. 5.

It should be noted that the sheets of material 12 in the pads described herein could be identical in shape and shifted or staggered in the pad so that a portion of each odd numbered sheet of material extends beyond an adjacent portion of the even numbered sheet of material stacked on top thereof. For example, the sheets of material 12a and 12b could have identical lengths 26a and 26b and identical widths 28a and 28b. In this instance, each of the odd numbered sheets of material 12b would be shifted in the pad 10 so that a portion of each odd numbered sheet of material 12b near the second end 20b thereof extends a distance beyond the second end 20a of the even numbered sheet of material 12a disposed on top thereof. In this instance, a portion of each of the even numbered sheets of material 12a near the first end 18a would extend a distance beyond the first end 18b of the odd numbered sheet of material 12b disposed thereunder. In a like manner, the sheets of material 12c and 12d shown in FIGS. 5 and 6 could have identical lengths 26c and 26d and identical widths 28c and 28d. In this last-mentioned instance, the odd numbered sheets of material 12d would be shifted with respect to the even numbered sheets of material 12c so that a portion of each odd numbered sheet of material 12d near the second side 16d thereof extends a distance beyond the second side 16c of the even numbered sheet of material 12c disposed on top thereof. In this instance, a portion of each of the even numbered sheets of material 12c near the first sides 14c would extend a distance beyond the first side 14b of the odd numbered sheet of material 12d disposed thereunder. The sheets of material shown in FIGS. 9, 10, 11 and 12 also could be identical in shape and shifted or positioned in the manner just described so that a portion of each of the odd numbered sheets of material extends a distance beyond an adjacent portion of the even numbered sheet of material disposed thereon. In short, the sheets of material 12 described herein could be identical in shape or have different shapes and the sheets of material 12 could be positioned in the pad 10 so that a portion of each of the odd numbered sheets of material 12 extends a distance beyond the even numbered sheet of material 12 disposed thereon for providing the interface to facilitate the removal of the sheets of material 12 from the pad in the manner described herein.

EMBODIMENT OF FIGS. 13 AND 14

Shown in FIG. 13 is another modified pad 10m which is constructed exactly like the pads 10 and 10c described in detail before, except the pad 10m is comprised of sheets of material 12m and 12n. The sheets of material 12m and 12n are constructed exactly like the sheets of material 12a and 12b shown in FIG. 2 and described in detail before, except the difference in lengths 26m of each of the sheets of material 12m as compared to the lengths 26n of each of the sheets of material 12n is due to a fold 60 in each of the sheets 12m.

Each of the even numbered sheets of material 12m includes a fold 60 disposed between ends 18m and 20m of the sheet 12m. The fold 60 causes the sheet 12m to be shorter than non-folded sheet 12n and thus permits the exposure of a portion of the sheet of material 12n disposed under the sheet of material 12m enhancing the separability of adjacent sheets 12m and 12n, and removal from the pad 10m. As will be clear to one of ordinary skill in the art, the fold 60 is shown as a component of the even-numbered sheet for convenience only and may instead be a component of an odd numbered sheet instead.

The even numbered sheets of material 12m and the odd numbered sheets of material 12n are wrapped about the item or floral grouping in the manners exactly like that described before.

The sheets 12m and 12n may be unconnected in the stack comprising the pad 10m or they may be connected together via a wicket 62 as shown in FIG. 13 and as discussed above. The wicket 62, is generally disposed through holes placed near the ends 18m and 18n of sheets 12m and 12n, respectively. This serves to allow the sheets 12m and 12n to be alternatingly arranged in a stack for ease of separation. When it is desired to use one of the sheets 12m or 12n for wrapping on item, such as a floral grouping, the sheet is simply torn away from or lifted from the wicket 62.

Shown in FIG. 14 is a pad 10p which is exactly the same as pad 10m, and having sheets 12p and 12q, with a sheet 12p having a fold 64 therein, except the sheets are connected by bonding material 30p and 30q in the same manner as the pad 10 shown in FIGS. 1 and 2. The sheets 12p and 12q are removable from the pad 10p and usable in the same manner as described above.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A pad of sheets of material comprising:
a stack of sheets of material substantially aligned along a top edge wherein some of the sheets of material in the stack comprise even numbered sheets of material and the remaining sheets of material in the stack comprise odd numbered sheets of material with each even numbered sheet having a notch therein and with each of the odd numbered sheets of material being positioned adjacent an even numbered sheet of material, each odd numbered sheet free of said notch, and wherein a portion of each odd numbered sheet of material extends a distance beyond the notch in the even numbered sheet of material which is adjacent and positioned below said odd numbered sheet.

2. The pad of claim 1 wherein each of the even numbered sheets of material has a shape which is different than a shape of the odd numbered sheets of material.

3. The pad of claim 1 wherein each of the even numbered sheets of material has a first side, a second side, a first end, a second end, a length extending between the first and the second ends thereof and a width extending between the first and the second sides thereof, and wherein each of the odd numbered sheets of material has a first side, a second side, a first end, and a second end, a length extending between the first and the second ends thereof and a width extending between the first and the second sides thereof.

4. The pad of claim 3 wherein the length of each of the even numbered sheets of material is less than the length of each of the odd numbered sheets of material, the first sides of the odd numbered sheets of material and the even numbered sheets of material are aligned and the second sides of the odd numbered sheets of material and the even numbered sheets of material are aligned and the first ends of the odd numbered sheets of material and the even sheets of material are aligned and wherein a portion of each of the odd numbered sheets of material near the second ends thereof extends a distance beyond the second end of the even numbered sheet of material disposed adjacent thereto.

5. The pad of claim 3 wherein the width of each of the even numbered sheets of material is less than the width of each of the odd numbered sheets of material, the first sides of the even numbered sheets of material and the odd numbered sheets of material are aligned and the second ends of the even numbered sheets of material and the odd numbered sheets of material are aligned and the first ends of the even numbered sheets of material and the odd numbered sheets of material are aligned and a portion of each of the odd numbered sheets of material near the second sides thereof extends a distance beyond the second side of the even numbered sheet of material disposed adjacent thereto.

6. The pad of claim 1 wherein each of the even numbered sheets of material is circularly shaped and has a diameter and each of the odd numbered sheets of material is circularly shaped and has a diameter and wherein the diameter of the even numbered sheets of material is less than the diameter of the odd numbered sheets of material.

7. The pad of claim 1 wherein each of the even numbered sheets of material is triangularly shaped and each of the odd numbered sheets of material is triangularly shaped.

8. The pad of claim 1 wherein the even numbered sheets and odd numbered sheets in the stack are connected via a wicket.

9. The pad of claim 1 wherein the notch in each even numbered sheet further comprises a corner removed from each even numbered sheet.

10. The pad of claim 1 wherein the sheets of material are constructed from the group of material consisting of paper, metal foil, natural synthetic cloth, denim, burlap, polymer film and combinations thereof.

11. A pad of sheets of material comprising:
a stack of sheets of material substantially aligned along a top edge wherein some of the sheets of material in the stack comprise even numbered sheets of material and the remaining sheets of material in the stack comprise odd numbered sheets of material with each even numbered sheet having a notch therein and with each of the odd numbered sheets of material being positioned adjacent an even numbered sheet of material, each odd numbered sheet free of a notch, and wherein a portion of each odd numbered sheet of material extends a distance beyond the notch in the even numbered sheet of material which is adjacent and positioned below said odd numbered sheet, each sheet of material having a bonding material disposed thereon near an end thereof, the bonding material on each sheet of material engaging an adjacent sheet of material for cooperating to hold the sheets of material in the stack.

12. The pad of claim 11 wherein each of the even numbered sheets of material has a shape which is different than a shape of the odd numbered sheets of material.

13. The pad of claim 11 wherein each of the even numbered sheets of material has a first side, a second side, a first end, a second end, a length extending between the first and the second ends thereof and a width extending between the first and the second sides thereof, and wherein each of the odd numbered sheets of material has a first side, a second side, a first end, and a second end, a length extending between the first and the second ends thereof and a width extending between the first and the second sides thereof.

14. The pad of claim 13 wherein the length of each of the even numbered sheets of material is less than the length of each of the odd numbered sheets of material, the first sides of the odd numbered sheets of material and the even numbered sheets of material are aligned and the second sides of the odd numbered sheets of material and the even numbered sheets of material are aligned and the first ends of the odd numbered sheets of material and the even sheets of material are aligned and wherein a portion of each of the odd numbered sheets of material near the second ends thereof extends a distance beyond the second end of the even numbered sheet of material disposed adjacent thereto.

15. The pad of claim 13 wherein the width of each of the even numbered sheets of material is less than the width of each of the odd numbered sheets of material, the first sides of the even numbered sheets of material and the odd numbered sheets of material are aligned and the second ends of the even numbered sheets of material and the odd numbered sheets of material are aligned and the first ends of the even numbered sheets of material and the odd numbered sheets of material are aligned and a portion of each of the odd numbered sheets of material near the second sides thereof extends a distance beyond the second side of the even numbered sheet of material disposed adjacent thereto.

16. The pad of claim 11 wherein each of the even numbered sheets of material is circularly shaped and has a diameter and each of the odd numbered sheets of material is circularly shaped and has a diameter and wherein the diameter of the even numbered sheets of material is less than the diameter of the odd numbered sheets of material.

17. The pad of claim 11 wherein each of the even numbered sheets of material is triangularly shaped and each of the odd numbered sheets of material is triangularly shaped.

18. The pad of claim 11 wherein the notch in each even numbered sheet further comprises a corner removed from each even numbered sheet.

19. The pad of claim 11 wherein the bonding material is further defined as selected from the group consisting of a pressure sensitive cohesive or adhesive, and a heat sealing lacquer.

20. The pad of claim 11 wherein the sheets of material are constructed from the group of material consisting of paper, metal foil, natural or synthetic cloth, denim, burlap, polymer film and combinations thereof.

21. A pad of sheets of material comprising:

a stack of sheets of material substantially aligned along a top edge wherein some of the sheets of material in the stack comprise even numbered sheets of material with only each even numbered sheet of material having a fold therein which extends from a first side of the sheet to a second side of the sheet and the remaining sheets of material in the stack comprise odd numbered sheets of material with each of the odd numbered sheets of material being positioned adjacent and above an even numbered sheet of material, said fold comprises a portion of said even numbered sheet being partially folded upon itself and wherein a portion of each odd numbered sheet of material is longer and extends a distance beyond a portion of the adjacent even numbered sheet of material.

22. The pad of claim 21 wherein the even numbered sheets and odd numbered sheets in the stack are connected into the pad via a wicket.

23. The pad of claim 21 wherein the sheets of material are constructed from the group of material consisting of paper, metal foil, natural or synthetic cloth, denim, burlap, polymer film and combinations thereof.

24. A pad of sheets of material comprising:

a stack of sheets of material substantially aligned along a top edge wherein some of the sheets of material in the stack comprise even numbered sheets of material with only each even numbered sheet of material having a fold therein which extends from a first side of the sheet to a second side of the sheet and the remaining sheets of material in the stack comprise odd numbered sheets of material with each of the odd numbered sheets of material being positioned adjacent and above an even numbered sheet of material, said fold comprises a portion of said even numbered sheet being partially folded upon itself and wherein a portion of each odd numbered sheet of material is longer and extends a distance beyond a portion of the adjacent even numbered sheet of material, each sheet of material having a bonding material disposed thereon near an end thereof, the bonding material on each sheet of material engaging an adjacent sheet of material for cooperating to hold the sheets of material in the stack.

25. The pad of claim 24 wherein the bonding material is further defined as selected from the group consisting of a pressure sensitive cohesive or adhesive, or a heat sealing lacquer.

26. The pad of claim 24 wherein the sheets of material are constructed from the group of material consisting of paper, metal foil, natural or synthetic cloth, denim, burlap, polymer film and combinations thereof.

* * * * *

UNITED STATES PATENT AND TRADEMARK OFFICE
CERTIFICATE OF CORRECTION

PATENT NO. : 5,792,535
DATED : August 11, 1998
INVENTOR(S) : Donald E. Weder

It is certified that error appears in the above-identified patent and that said Letters Patent is hereby corrected as shown below:

Column 5,
Line 65, delete sentence "After circularly or triangulary shaped.".

Column 6,
Line 17, after word "and" and before number "12d" add following "odd numbered sheets of material".
Lines 25, 26 and 48, change word "widths" to -- width --.
Lines 35 and 64, change word "manners" to -- manner --.
Line 45, change word "lengths" to -- length --.
Line 46, change word "are" to -- is --; and change word "lengths" to word -- length --.
Line 49, change word "are" to -- is --; and change word "widths" to word -- width --.
Line 64, change word "log" to number -- 10g --.

Column 7,
Line 1, change word "log" to number -- 10g --.
Lines 9 and 11, change word "being" to word -- is --.
Line 22, change word "manners" to -- manner --.
Line 31, change word "as" to word -- are --.
Line 34, after number "12k" and before word "shown" add word -- are --.
Line 37, change word "larger" to word -- smaller --.
Lines 39 and 51, change word "side" to word -- base --.
Line 43, change word "is" to word -- are --.

Column 8,
Line 16, change word "sides" to word -- side --.
Lines 38 and 39, change word "lengths" to word -- length --.
Line 55, change word "manners" to word -- manner --.

UNITED STATES PATENT AND TRADEMARK OFFICE
CERTIFICATE OF CORRECTION

PATENT NO. : 5,792,535
DATED : August 11, 1998
INVENTOR(S) : Donald E. Weder

It is certified that error appears in the above-identified patent and that said Letters Patent is hereby corrected as shown below:

Column 9,
Line 3, change number "64" to number -- 60 --.

Signed and Sealed this

Twenty-seventh Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 5,792,535
DATED : August 11, 1998
INVENTOR(S) : Donald E. Weder

It is certified that error appears in the above-identified patent and that said Letters Patent is hereby corrected as shown below:

Title page,
Item [56] References Cited, U.S. PATENT DOCUMENTS, delete "1,444,563" and substitute therefor -- 1,446,563 --.

Column 1,
Line 50, after word "form" and before word "a" add word -- of --.

Column 2,
Lines 46-47, change word "shape" to word -- size --.

Column 3,
Line 42, "change number "22" to number -- 24 --.
Line 56, after word "material" and before word "are" add number -- 12 --.
Line 57, after word "material" and before word "which" add number -- 12 --.
Line 60, after word "material" add number -- 12 --.
Line 61, after word "material" and before word "could" add number -- 12 --.

Column 4,
Line 9, after word "grouping" and before word "are" add number --32 --.
Line 50, after word "material" and before word "so" add number -- 12 --.
Line 52, after word "end' and before "of" add number -- 38 --; and after word "grouping" and before word "and" add number -- 32 --.
Line 57, after word "grouping" and before word "extends" add number -- 32 --.

Column 5,
Line 48, change "12 have" to -- 12a has --.
Line 49, after number "12b" and before word "been" change word "have" to word -- has --.
Line 54, change word "are" to word -- is --.
Line 65, delete sentence "After circularly or triangularly shaped.".

Column 6,
Line 17, after word "and' and before number "12d" add following "odd numbered sheets of material".
Line 25, 26 and 48, change word "widths" to -- width --.
Lines 35 and 62, change word "manners" to -- manner --.
Line 45, change word "lengths" to -- length --.

UNITED STATES PATENT AND TRADEMARK OFFICE
CERTIFICATE OF CORRECTION

PATENT NO.   : 5,792,535
DATED        : August 11, 1998
INVENTOR(S)  : Donald E. Weder It is certified that error appears in the above-identified patent and that said Letters Patent is hereby corrected as shown below:

Column 6 (con't),
Line 46, change word "are" to -- is --; and change word "lengths" to word -- length --.
Line 49, change word "are" to -- is --; and change word "widths" to word -- width --.
Line 64, change word "log" to number -- 10g --.

Column 7,
Line 1, change word "log" to number -- 10g --.
Lines 9 and 11, change word "being" to word -- is --.
Line 22, change word "manners" to -- manner --.
Line 31, change word "as" to word -- are --.
Line 34, after number "12k" and before word "shown" add word -- are --.
Line 37, change word "larger" to word -- smaller --.
Line 39, change word "side" to word -- base --.
Line 43, change word "is" to word -- are --.
Line 51, change word "side" to word -- base --.

Column 8,
Line 16, change word "sides" to word -- side --.
Lines 38-39, change word "lengths" to word -- length --.
Line 55, change word "manners" to word -- manner --.

Column 9,
Line 3, change number "64" to number --60 --.

Signed and Sealed this

Fifth Day of October, 2004

JON W. DUDAS
*Director of the United States Patent and Trademark Office*